Dec. 29, 1931.    P. L. ALGER    1,839,078
WINDING FOR DYNAMO ELECTRIC MACHINES
Filed Nov. 14, 1928
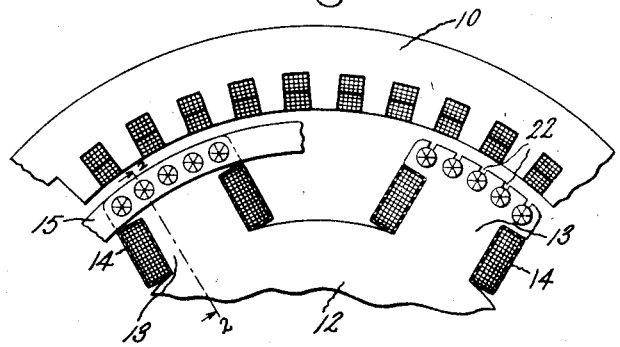
Inventor:
Philip L. Alger,
by Charles E. Tullar
His Attorney.

Patented Dec. 29, 1931

1,839,078

UNITED STATES PATENT OFFICE

PHILIP L. ALGER, OF SCHENECTADY, NEW YORK, ASSIGNOR TO GENERAL ELECTRIC COMPANY, A CORPORATION OF NEW YORK

WINDING FOR DYNAMO ELECTRIC MACHINES

Application filed November 14, 1928. Serial No. 319,397.

My invention relates to windings for dynamo electric machines.

One of the factors which has heretofore limited the capacity of single phase induction and synchronous motors of economical design has been the copper losses occurring in the squirrel cage windings thereof due to the double frequency currents induced therein by the pulsating armature reaction. It has not been possible to reduce these copper losses below a certain limit by increasing the size of the bars of the squirrel cage winding because the eddy currents induced therein increase very rapidly with increase in size of the bars. It has not been practicable to avoid eddy currents in large bars of this kind by the use of a rectangular conductor having transposed strands such as shown, for example, by Roebel Patent No. 1,144,252 of June 22, 1915, because the forms of stranded conductors heretofore proposed are not sufficiently rigid to support the end-rings of the squirrel-cage winding, and because of the difficulty of properly insulating the transposition points in the bar. Moreover, in order to avoid overheating of the winding, it is essential to provide good thermal contact between the bars of the squirrel-cage and the supporting core structure, and in the case of stranded conductors also to provide contact between each of the strands of the bars and the core structure so that the bars are cooled by conduction of heat thereto. For this reason the bars have ordinarily been made solid and tightly fitted in the slots of the core structure into which they were pressed or driven. Stranded conductors, of the forms heretofore proposed, could not therefore be used as they bulge when it is attempted to drive or press them into the slots, and even if they can be arranged in the slots many of the strands are not in contact with the core structure, so that conduction of heat from the winding to the core structure is impaired and overheating of the winding results. In addition to this the space factor or ratio of the cross-sectional area of the copper in the slot to the cross-sectional area of the slot, of the usual form of stranded conductor or cable bar, is undesirably low.

The object of my invention is to provide a winding of this character for alternating current dynamo-electric machines which is sufficiently rigid to support the end-rings thereof on the core structure, in which eddy current losses are minimized, which can be driven into the slots of the core structure so as to make good thermal contact therewith, and in which a portion of the surface of every separate part of the bar forms a portion of the periphery thereof. I accomplish this by providing a round conductor consisting of segments having two surfaces conforming to adjacent segments and a curved surface forming a portion of the periphery of the conductor.

My invention will be more fully set forth in the following description, referring to the accompanying drawings, and the features of novelty which characterize my invention will be pointed out with particularity in the claims annexed to and forming a part of this specification.

In the drawings Fig. 1 is a fragmentary elevation of a dynamo electric machine embodying my invention partly broken away; Fig. 2 is a sectional view of a portion of the squirrel cage winding and the supporting core structure on the line 2—2 of Fig. 1; Fig. 3 is an end elevation of the conductor bar and a portion of the end-ring shown in Fig. 2, and Fig. 4 is a section on the line 4—4 of Fig. 2.

Referring to the drawings, I have shown my invention in connection with a single phase synchronous motor including a stator 10 and a rotor 12 provided with salient poles 13 having exciting winding 14 mounted thereon and a squirrel cage pole face winding 15. The squirrel cage pole face winding in a single phase machine of this character reduces the reactance of the motor and the core losses therein by preventing the backwardly rotating component of the pulsating field from passing into the poles 13. This backwardly rotating component of the field induces double frequency currents in the squirrel-cage winding which in machines of large capacity cause large copper losses in the conductor bars. It has not, heretofore, been possible to decrease the copper losses in these windings by increasing the size of the conductor bars beyond a certain point because eddy current losses in the bars increase very rapidly with an increase in size thereof.

In accordance with my invention, therefore, I provide a conductor bar for a squirrel-cage winding which can be made approximately twice as deep as a solid bar thereby correspondingly reducing the copper losses without increasing the eddy current losses therein. I do this by making the conductor bars 16 of the squirrel-cage winding, which are brazed or welded in the openings 17 in the annular short-circuiting end-rings 18, of a plurality of segments 19 having flat surfaces 20 conforming to the adjacent segments and a curved surface 21 forming a portion of the periphery of the conductor bar. The flat surfaces 20 are insulated from the adjacent segments by asbestos strips, or other suitable insulation indicated at 16a. I prefer, however, to place the outer periphery of the bar in close contact with the core structure of the machine in which it is used, so that I use little or no insulation on the outer periphery of the bar, although, if desired, a suitable coating may be applied to the bar which will electrically insulate the same from the laminations of the core structure without substantially interfering with the conduction of heat from the bar thereto.

The eddy current losses in the bar are avoided by twisting the opposite ends thereof relative to each other. Although the bar may be twisted in any suitable manner, I prefer to twist the opposite ends thereof substantially 360 degrees with respect to each other or multiples of 360 degrees and to uniformly distribute the twist throughout the length of the bar, so that the same will be of uniform diameter throughout its length and can be pressed or driven through the slots 22 in the core structure. Furthermore making the bar of uniform cross-section throughout its length enables me to fit the same in the slots 22 so that all portions of the bar are in good thermal contact with the core structure, so that the conduction of heat from the bars to the core structure will minimize its temperature rise. By making the bar of a plurality of segments 19, each of which forms a portion of the periphery of the bar, it will be observed that every strand or segment of the bar is in good thermal contact with the core structure, so that the entire squirrel-cage winding is adequately cooled by conduction of heat from each of the segments of the bars thereof and, as a result, overheating of the winding is avoided. Moreover, as the bars are made of a plurality of segments 19 they are mechanically strong enough to rigidly support the end-rings of the squirrel cage winding and also to permit the bars to be pressed or driven into the slots in assembling the winding.

Modifications of the particular embodiment of my invention, which I have described, will occur to those skilled in the art, so that I do not desire my invention to be limited to the particular construction set forth, except as defined in the appended claims.

What I claim as new and desire to secure by Letters Patent of the United States, is:

1. A dynamo-electric machine comprising a stator, a rotor having a slotted core structure, a winding including a plurality of round conductors arranged in the slots of said core structure, each of said conductors consisting of a plurality of segments each having two flat surfaces insulated from the adjacent segments and a curved surface forming a portion of the periphery of the conductor, said conductors being twisted about their axes and uniformly throughout their length so as to reduce eddy current losses therein, and end rings connecting said conductors.

2. A single phase alternating current dynamo-electric machine comprising a stator, a rotor comprising a plurality of salient poles having windings and slots extending across the face thereof, a pole-face winding including a plurality of round conductors arranged in the slots of said poles, each of said conductors consisting of a plurality of segments each having two flat surfaces insulated from adjacent segments and a curved surface forming a portion of the periphery of the conductor, said conductors being twisted uniformly throughout the length thereof so as to reduce eddy current losses therein, and end rings connecting said conductors.

In witness whereof, I have hereunto set my hand this 13th day of November, 1928.

PHILIP L. ALGER.